United States Patent
Rodrigues et al.

(10) Patent No.: US 12,158,670 B1
(45) Date of Patent: Dec. 3, 2024

(54) DUAL-SIDED WAVEGUIDE DISPLAY WITH IMPROVED LIGHT SCATTERING

(71) Applicant: Toyota Motor Engineering & Manufacturing North America, Inc., Plano, TX (US)

(72) Inventors: Sean P. Rodrigues, Ann Arbor, MI (US); Suman Halder, Kent, OH (US); Deng-Ke Yang, Kent, OH (US)

(73) Assignees: Toyota Motor Engineering & Manufacturing North America, Inc., Plano, TX (US); Kent State University, Kent, OH (US)

(*) Notice: Subject to any disclaimer, the term of this patent is extended or adjusted under 35 U.S.C. 154(b) by 0 days.

(21) Appl. No.: 18/440,259

(22) Filed: Feb. 13, 2024

(51) Int. Cl.
G02F 1/1343 (2006.01)
F21V 8/00 (2006.01)

(52) U.S. Cl.
CPC ..... *G02F 1/134309* (2013.01); *G02B 6/0063* (2013.01); *G02B 6/0068* (2013.01); *G02B 6/0095* (2013.01)

(58) Field of Classification Search
CPC ............ G02F 1/134309; G02B 6/0063; G02B 6/0068; G02B 6/0095
USPC ............................... 349/96–98, 110–111, 139
See application file for complete search history.

(56) References Cited

U.S. PATENT DOCUMENTS

| | | | |
|---|---|---|---|
| 8,253,153 B2 | 8/2012 | Shanks | |
| 10,121,992 B2 | 11/2018 | Hu | |
| 10,403,612 B2 | 9/2019 | Lo et al. | |
| 10,437,064 B2 | 10/2019 | Popovich et al. | |
| 10,620,477 B2 | 4/2020 | Li et al. | |
| 10,996,501 B1 | 5/2021 | Yin | |
| 11,665,788 B1 | 5/2023 | Dede et al. | |
| 11,774,787 B2 | 10/2023 | Rodrigues | |
| 2011/0261291 A1 | 10/2011 | Park et al. | |
| 2014/0104547 A1 | 4/2014 | Kuo et al. | |
| 2019/0066600 A1 | 2/2019 | Wang et al. | |
| 2019/0146216 A1 | 5/2019 | Mourou et al. | |
| 2021/0405405 A1 | 12/2021 | Chiang et al. | |
| 2022/0396205 A1 | 12/2022 | Rodrigues et al. | |
| 2023/0004029 A1 | 1/2023 | Rodrigues | |
| 2024/0036372 A1* | 2/2024 | Yang .................. | G02B 6/0063 |

* cited by examiner

*Primary Examiner* — Charles S Chang
(74) *Attorney, Agent, or Firm* — Christopher G. Darrow; Darrow Mustafa PC

(57) ABSTRACT

Various arrangements described herein relate to a dual-sided display with improved light scattering. In one embodiment, a display is disclosed. The display includes an inside transparent layer disposed parallel to and spaced apart from an outside transparent layer. The display also includes a liquid crystal (LC) layer disposed between the inside transparent layer and the outside transparent layer and together forming a waveguide that is planar. The display includes ground electrodes disposed between the LC layer and the outside transparent layer and arranged in strips along the transparent layer, the strips being spaced apart and parallel. The display includes inside electrodes and outside electrodes disposed between the inside transparent layer and the LC layer and defining a geometric pattern that is in plane with the waveguide and a light source disposed at an edge surface of the waveguide and providing light along the waveguide.

17 Claims, 3 Drawing Sheets

DUAL-SIDED WAVEGUIDE DISPLAY WITH IMPROVED LIGHT SCATTERING

TECHNICAL FIELD

The subject matter described herein relates, in general, to transparent displays, and, in particular, to a transparent display with a particular arrangement of electrodes to improve light scattering.

BACKGROUND

Transparent displays are a type of viewing panel that provides images to viewers but also permits the viewer to see through the display. Thus, such displays may appear clear when not in use or in areas with no image displayed. That is, a displayed image may appear to be opaque or slightly transparent, while areas not displaying the image are transparent. Moreover, some transparent displays may further provide for displaying separate images on opposing sides of the display panel. However, because of the transparent nature of such displays, the configuration of elements within the displays for creating images may be limited. As a result, the displays can suffer from difficulties with brightness and low contrast ratios, thereby impeding the applicability.

SUMMARY

Various embodiments relate to transparent displays with improved light scattering. As noted previously, transparent displays may encounter difficulties with brightness, contrast ratios, etc. due to limitations on the configuration of elements within the display. Accordingly, in at least one approach, a presently disclosed configuration overcomes the noted difficulties by providing a unique arrangement of elements with improved light scattering, which is realized as improvements to brightness and contrast. For example, a display is formed by sandwiching multiple layers of elements together. The separate elements serve different roles in the display and generally include an outside transparent layer, a ground electrode, a liquid crystal (LC) layer, inside electrodes, outside electrodes, and an inside transparent layer, among others. In any case, the inside electrodes and the outside electrodes, along with the ground electrodes, define pixels within the display. Depending on which electrode is associated with a pixel (e.g., inside vs outside), the pixel scatters light introduced via an edge-based light source either through the inside transparent layer or the outside transparent layer.

Accordingly, the display is able to generate images on both the inside transparent layer and the outside transparent layer. Moreover, the display appears transparent when not in use even though the various elements are present within a field of view of the display. However, because various configurations of the electrodes do not completely align with the light source, in various arrangements, the brightness/contrast of the display may be diminished. Thus, the inside electrodes and the outside electrodes are arranged in a particular geometric pattern to improve the scattering of the light. For example, consider that for purposes of discussion, the display is generally formed in a rectangular form in the y/x axes. The separate layers are stacked in the z-axis. In an instance where the light source is along one edge of the y-axis, the light is projected through the display along the x-axis. Whereas some arrangements of the electrodes provide for light propagating through unoccupied regions in the direction of the y-axis where no pixels can scatter the light, in various arrangements described herein, the electrodes are arranged into a geometric pattern to minimize these unoccupied regions, thereby improving the light scattering of the display.

For example, in one approach, the geometric pattern includes wide strips of the inside and outside electrodes in parallel runs along the x-axis and distributed in the y-axis such that gaps between the electrodes are minimized. In a further example, the geometric pattern defines a diagonal shape of the electrodes such that areas with pixels leave substantially no unoccupied regions. In this way, the construction of the display improves light scattering to provide better brightness and contrast.

In one embodiment, a display is disclosed. The display includes an inside transparent layer disposed parallel to and spaced apart from an outside transparent layer. The display includes a liquid crystal (LC) layer disposed between the inside transparent layer and the outside transparent layer and together forming a waveguide that is planar. While a waveguide is discussed throughout, it should be appreciated that the present approach may also be implemented as a light plate that guides the light within the display. In any case, reference is generally provided to a waveguide herein but is intended to encompass both a waveguide and a light plate. The display includes ground electrodes disposed between the LC layer and the outside transparent layer and arranged in strips along the transparent layer, the strips being spaced apart and parallel. The display includes inside electrodes and outside electrodes disposed between the inside transparent layer and the LC layer and defining a geometric pattern that is in plane with the waveguide. The display includes a light source disposed at an edge surface of the waveguide and providing light along the waveguide.

In another embodiment, a dual-sided display is disclosed. The dual-sided display includes an inside transparent layer disposed parallel to and spaced apart from an outside transparent layer. The display includes a liquid crystal (LC) layer disposed between the inside transparent layer and the outside transparent layer and together forming a waveguide that is planar. The display includes ground electrodes disposed between the LC layer and the outside transparent layer and arranged in strips along the transparent layer, the strips being spaced apart and parallel. The display includes inside electrodes and outside electrodes disposed between the inside transparent layer and the LC layer and defining a geometric pattern that is in plane with the waveguide, wherein the geometric pattern forms pixels at overlaid intersections with the ground electrodes to scatter the light from the waveguide. The display includes a light source disposed at an edge surface of the waveguide and providing light along the waveguide.

In one embodiment, a vehicle window is disclosed. The window includes an inside transparent layer disposed parallel to and spaced apart from an outside transparent layer. The window includes a liquid crystal (LC) layer disposed between the inside transparent layer and the outside transparent layer and together forming a waveguide that is planar. The window includes ground electrodes disposed between the LC layer and the outside transparent layer and arranged in strips along the transparent layer, the strips being spaced apart and parallel. The window includes inside electrodes and outside electrodes disposed between the inside transparent layer and the LC layer and defining a geometric pattern that is in plane with the waveguide. The geometric pattern defines one of: i) a diagonal repeating pattern that extends across the ground electrodes with complementary shapes of the inside electrodes and the outside electrodes, and ii) parallel strips of the inside electrodes and the outside electrodes that are together perpendicular to the ground electrodes and have a wider width than the ground electrodes. The vehicle window includes a light source disposed at an edge surface of the waveguide and providing light along the waveguide.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
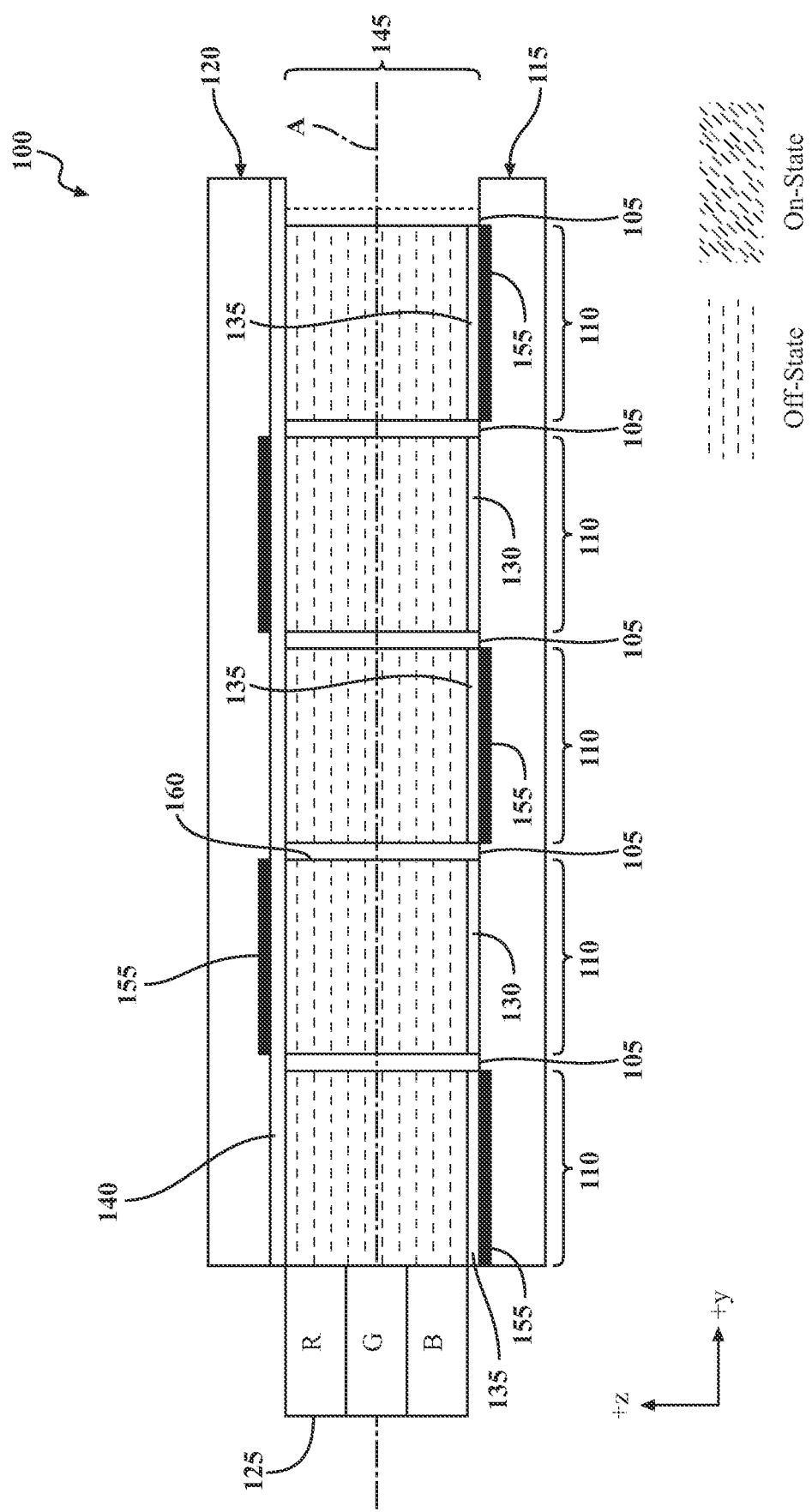
FIG. 1 illustrates one example of a cross-section view of a display.

Various arrangements associated with a dual-sided transparent display having improved light scattering are disclosed. As noted previously, various implementations of dual-sided displays can encounter difficulties with brightness and contrast due to reduced light scattering. These difficulties can be caused by various aspects of the design. For example, because electrodes of the display may be arranged in a manner that does not capture all of the light imparted via an edge of the device, the light scattering efficiency may suffer, thereby also negatively influencing the contrast.

Therefore, in at least one approach, a presently disclosed configuration overcomes the noted difficulties by providing a unique arrangement of elements with improved light scattering. In general, a transparent display may be formed by sandwiching multiple layers of elements together. The separate elements serve different roles in the display and generally include, in a general order as may occur within the display, an outside transparent layer, a ground electrode, a liquid crystal (LC) layer, inside electrodes, outside electrodes, and an inside transparent layer, among other layers. In any case, the inside electrodes and the outside electrodes, along with the ground electrodes, define pixels within the display where, for example, the inside/outside electrodes overlap with the ground electrodes. While the electrodes are described as overlapping, it should be appreciated that the electrodes do not touch but are instead separated by the LC layer, which is activated by the electrodes to scatter the light, and thus overlap from a top-down 2D perspective although actually being separated by one or more other layers. Depending on which electrode is associated with a pixel (e.g., inside vs outside), the pixel scatters light, which is introduced via an edge-based light source, either through the inside transparent layer or the outside transparent layer.

Accordingly, the display is able to generate images on both the inside transparent layer and the outside transparent layer to act as a dual-sided display where the separate images are only visible via a respective viewing side. Moreover, the display appears transparent when not in use even though the various elements are present within a field of view of the display due to the transparency of the various elements included therein, including the electrodes themselves. To improve the light scattering of the display, the inside electrodes and the outside electrodes are arranged in a particular geometric pattern. For example, consider that for purposes of discussion the display is generally formed in a rectangular planar shape extending in the y/x axes. The separate layers are stacked in the z-axis. In an instance where the light source is along one edge of the y-axis, the light is projected through the display along the x-axis. Whereas some arrangements of the electrodes provide for light propagating through unoccupied regions in a direction of the y-axis where no pixels can scatter the light, in various arrangements described herein, the electrodes are arranged into a geometric pattern to minimize these unoccupied regions, thereby improving the light scattering of the display.

For example, in one approach, the geometric pattern includes strips of the inside and outside electrodes in parallel runs along the x-axis and distributed in the y-axis such that gaps between the electrodes are minimized. In this example, the inside/outside electrodes are wider than the ground electrodes, thereby forming pixels that are rectangular and slender in form with a width of the ground electrodes. In a further example, the geometric pattern defines a diagonal shape of the electrodes such that areas with pixels leave substantially no unoccupied regions. In this way, the construction of the display improves light scattering to provide better brightness and contrast.

With reference to FIG. 1, one arrangement of a dual-sided display 100 is shown from a cross-sectional view along the y-axis. The dual-sided display 100 is formed into a waveguide with a plurality of inside pixels 105 and a plurality of outside pixels 110 parallel to and in-plane with the plurality of inside pixels 105. As used herein, the term "inside" refers to a −z side of the display 100 shown in the figures. The term "outside" refers to a +z side of the display 100. For example, in some variations, the inside is an interior side of a vehicle window and the outside is an exterior side of the vehicle window. However, it should be understood that the terms inside and outside are used herein for the purpose of description, and the display may be arranged in any manner to display images. Moreover, the inside pixels 105 refer to pixels that scatter light in the −z direction, whereas the outside pixels scatter light in the +z direction. Accordingly, it should be appreciated that a controller actively and selectively controls a plurality of pixels within the display 100 to form images that are displayed toward the inside, the outside, or both. The controller, in various arrangements, can simultaneously and independently control the inside pixels 105 and the outside pixels 110 to display the same or separate images.

In general, the inside pixels 105 and the outside pixels 110 are disposed between an inside transparent layer 115 and an outside transparent layer 120. The transparent layers 115/120 are spaced apart and are parallel to one another. The transparent layers 115/120 are generally planar surfaces having a defined thickness in the z-axis. Also, the transparent layers 115/120 have an inner surface closest to an axis of symmetry A 160 and an outer surface farthest from the axis of symmetry A 160. As a non-limiting example, the transparent layers 115/120 may be comprised of glass, polymers, and ceramics. In general, the transparent layers 115/120 exhibit a characteristic of being substantially transparent, i.e., light transmitting without substantially attenuating light or otherwise modifying characteristics of the light scattered by pixels of the display 100. Of course, in various arrangements, the transparent layers 115/120 can be configured to adapt the light by aligning/directing the light or performing other desired functions. In any case, the transparent layers 115/120 are generally transparent in that they are intended to generally transmit the incident light.

The display 100 further includes a light source 125 that generates light and is attached to the display 100. That is, the display 100 is an edge-lit display where the light source 125 emits light into an edge of the display 100. The waveguide formed by the combination of layers then guides the light to propagate along the display 100 and is scattered via the pixels 105/110. In FIG. 1, the light source 125 is shown as emitting the light via an edge of the display in the +y-axis direction; however, it should be appreciated that light source 125 can instead be positioned to emit light along the +x-axis direction, which would be into the figure, as presently illustrated in FIG. 1. Thus, the light source 125 is generally shown in the present configuration for purposes of discussion but is, in various arrangements, positioned in a different configuration. Furthermore, the light source 125 may emit light of different combinations of wavelengths, such as red, green, and blue (RGB) light, which may be generated via RGB lasers, light emitting diodes (LEDs), micro-LEDs, quantum dots, and so on.

With further reference to the construction of the display 100, the pixels 105/110 are formed from an arrangement of various electrodes. For example, inside electrodes 130 and outside electrodes 135 are transparent (e.g., at least 65% light transmitting) and are the active electrodes. The electrodes 130/135 are formed from, in various arrangements, indium tin oxide (ITO), or another suitable electrode material for transparent displays. A ground electrode 140 extends in a perpendicular direction to the inside/outside electrodes 130/135 and apart from the electrodes 130/135 being separated by a liquid crystal (LC) layer 145. The ground electrode 140 is similarly formed from indium tin oxide (ITO), or another suitable electrode material for transparent displays. It should be appreciated that the ground electrode 140 forms a complete circuit in relation to the electrodes 130/135 in order to provide for activating areas of the LC layer 145 disposed therebetween, which forms the pixels.

In general, the display 100 improves various attributes of images displayed thereon by improving the scattering of light emitted into the waveguide via the light source 125. One way in which the presently disclosed embodiments achieve this improvement is according to an arrangement of the electrodes that functions to form the pixels 105/110. In various configurations, the geometric pattern formed between the electrodes 130/135/140 functions to better capture and scatter the light. Additional details about the geometries will be described further subsequently. In any case, it should be noted that the intersections are defined in relation to how the inside/outside electrodes 130/135 and the ground electrode 140 cross while separated by the LC layer 145. These separate areas where the electrodes cross form the pixels 105/110 that ultimately function to scatter the light. Thus, the geometric pattern defines the relationships of the pixels with the light source 125 in order to achieve improved light scattering.

For example, as shown in FIG. 1, the geometry of the electrodes 130/135/140 along the cross-section permits light to pass through at the unoccupied regions 150. In general, the geometric pattern formed by the pixels 105/110 in a direction of the light propagation minimizes the unoccupied regions with each separate cross-section and/or between multiple separate cross sections. Thus, in a configuration in which the electrodes 130/135 are arranged in a parallel pattern, the unoccupied region 150 remains between separate sections of the display 100, and thus the light scattering of the parallel pattern may be, for example, about 87%. By contrast, in a configuration where the electrodes 130/135 are routed in a diagonal manner, the unoccupied region of a single cross-section may be larger than in the parallel pattern; however, the unoccupied region in the diagonal pattern is occupied in a subsequent section by a pixel, thereby providing about 100% light scattering. Further aspects of the different geometric patterns will be described with subsequent figures.

Continuing with additional details of the display 100, as shown in FIG. 1, the display 100 further includes masks 155. The masks 155 function to block the transmission of light in the +z direction and the −z direction depending on the pixel with which the a given one of the masks 155 is associated. The masks 155 are disposed between the electrodes and the transparent layers to block light from the pixels 105/110 being scattered in a wrong direction. For example, the outside pixels 110 are designed with the intention of scattering light through the outside transparent layer 120 and not through the inside transparent layer 115. However, when the controller activates the LC layer 145 at the pixels 110, the pixels 110 do not intentionally scatter the light in only the +z direction but also in the −z direction. As such, in order to focus the scattering and prevent the light from bleeding in the incorrect direction, the display includes the masks 155. Of course, for the inside pixels 105, the masks 155 are situated to block the light from scattering to the outside, as shown in FIG. 1. The masks 155 may be formed from a material that is, for example, transparent when viewed from one direction while being reflective and/or absorbent when viewed from an opposing direction. In one configuration, the masks 155 are comprised of reflective material on a first side and light-absorbing material on a second side. In a further approach, the masks 155 may simply provide one side that is light-absorbing. In this way, the masks 155 can generally preserve the overall transparent nature of the display while facilitating focusing of the light from the pixels of a given direction.

Returning to the LC layer 145 of FIG. 1, the LC layer 145 is a liquid crystal material mixed with a monomer, which is polymerized. The polymerization and orientation of the liquid crystal material and monomer induce scattering sufficient for the display 100 to generate images. The inside and the outside electrodes 130/135 are configured to apply a voltage to the liquid crystal material in the LC layer 145. In addition, the scattering of light by the LC layer 145 sandwiched between the pair of transparent layers is controlled by voltage applied across the electrodes 130/135 at a given pixel. That is, under one voltage condition (e.g., a first voltage), the LC layer 145 at an active pixel is transparent and does not scatter light, while under another voltage condition (e.g., a second voltage not equal to the first voltage), the LC layer 145 at the given pixel is opaque and scatters the light.

In general, the LC layer has two different refractive indices, $n_e$ (extraordinary) and $n_o$ (ordinary), that depend on an electro-optical state of the liquid crystal material at a given pixel. For example, molecules of the liquid crystal material in an "off-state" allow light to transmit since there is no disruption to the flow or propagation of light. By contrast, in the "on-state" the voltage disrupts the polymerized molecules, changing the liquid crystal alignment, thereby inducing scattering. Accordingly, and in response to electrical control (e.g., a voltage), the molecules of the LC layer 145 orient themselves differently in the off-state and the on-state.

While not explicitly illustrated, the display 100, in at least one arrangement, includes a driver circuit that is configured to provide electrical control independently to the pixels 105/110. That is, the driver circuit is configured to provide electrical control independently to the inside electrode 130 and the outside electrode 135 to selectively activate the pixels 105/110. In addition, the driver circuit is configured to provide electrical control to the light source 125 such that a predefined light (i.e., a predefined range of electromagnetic radiation (EMR)/optical wavelengths such as "green light") propagates from the light source 125 and within the waveguide. It should be understood that the predefined light is reflected from an outer surface (−z direction) of the inside transparent layer 115, an outer surface (+z direction) of the outside transparent layer 120, and propagates through the LC Layer 145. However, when the predefined light propagates into a pixel in the on-state, the pixel scatters the light in a plurality of directions.

For example, the scattered light propagates towards the transparent layers 115/120. Accordingly, depending on which pixel scatters the light, some of the light may be absorbed and/or reflected by the masks 155. Thus, it should be understood that scattered light can provide an image in both the +z and −z directions depending on which pixels are active in order to form separate images within the dual-sided display 100.

Figure 2:
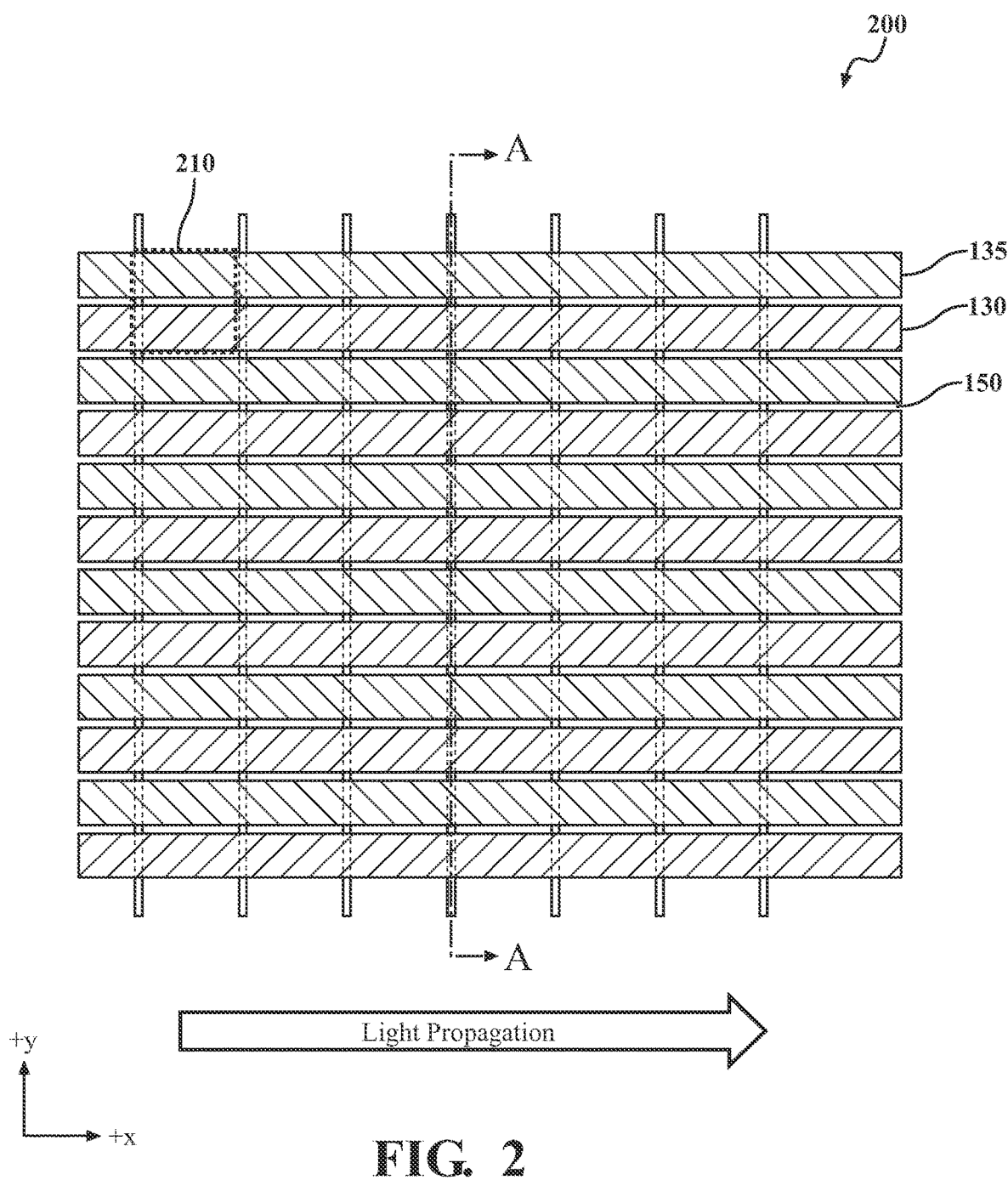
FIG. 2 illustrates one embodiment of a geometric pattern for electrodes of the display of FIG. 1.

With reference to FIG. 2, one example of a geometric pattern 200 of the electrodes 130/135/140 is shown. In this example, the inside/outside electrodes 130/135 run in parallel repeating strips with the ground electrodes 140 running perpendicular thereto in similarly parallel repeating strips. As shown in FIG. 2, the light propagates in the +x direction and thus can propagate along the unoccupied regions 150. However, the intersections of the electrodes 130/135 with the ground electrodes 140 represent locations of the pixels 105/110. As such, the unoccupied regions 150 do not include pixels to scatter the light. A further feature of the geometric pattern for electrodes, as shown in FIG. 2, is the difference in widths of the electrodes 130/135/140. In general, the inside electrodes 130 and the outside electrodes 135 are wider in width than the ground electrodes 140. For example, the inside/outside electrodes 130/135 are 140 μm, whereas the ground electrodes 140 are 32 μm. Of course, the relative sizes of the electrodes 130/135/140 may vary, but the electrodes 130/135 are generally wider (e.g., at least 1.5 times wider) than the ground electrodes 140. It should be noted that, in at least one arrangement, the total active area of the electrodes 130/135/140 is 9%, thereby maintaining transparency.

Moreover, FIG. 2 illustrates one example of a unit cell 210. It should be appreciated that while the unit cell 210 is illustrated as having a particular size, in further arrangements, the unit cell 210 may be larger, such as encompassing additional active areas, including one or more additional ground electrodes and one or more additional inside/outside electrodes. In the illustrated example, the unit cell 210 is approximately 320 μm by 320 μm. In any case, as shown in FIG. 2, the arrangement of electrodes in the geometric pattern forms a lattice with the inside and outside electrodes 130/135 defining a first direction of the lattice and the ground electrodes 140 defining a second direction of the lattice.

Figure 3:
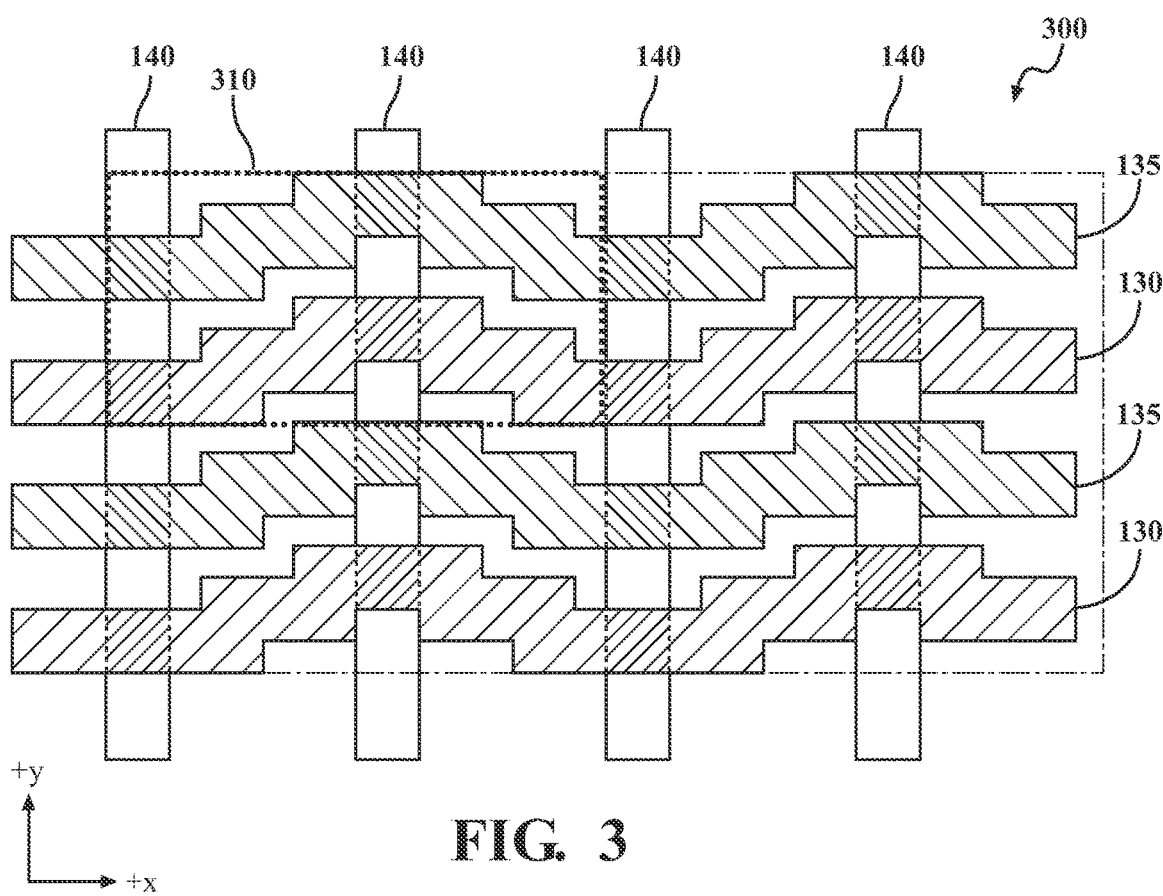
FIG. 3 illustrates another embodiment of a geometric pattern for electrodes of the display of FIG. 1.

With reference to FIG. 3, a further example of a geometric pattern 300 of the electrodes 130/135/140 is shown. The geometric pattern 300 illustrates a diagonal pattern where the inside/outside electrodes 130/135 are formed in a diagonal orientation as they move across the display in a +x direction. The diagonal pattern is generally characterized by the placement of the inside/outside electrodes in a varying +/−y-direction as the electrodes progress over the x-direction of the display. That is, instead of the electrodes being in uniform parallel strips that are generally rectangular, the electrodes 130/135 remain generally parallel but are slanted in a diagonal manner, as shown.

In general, the effect of the diagonal pattern is to locate the pixels, which at occur at the intersection of the electrodes, at positions to avoid the unoccupied regions for light traveling in the x-direction, as illustrated in FIG. 2. As shown, the diagonal pattern functions to offset pixels of the same electrode between subsequent strips of the ground electrodes 140, thereby providing better coverage to scatter the light and avoiding the unoccupied regions. In general, the diagonal pattern is shown with electrodes having a width of 80 μm, including the inside, outside, and ground electrodes 130/135/140. Moreover, FIG. 3 illustrates a unit cell 310 that is 320 μm by 320 μm. Similar to the unit cell 210, the unit cell 310 may be formed of a different size that includes additional pixels. In any case, because of the diagonal pattern in the example of FIG. 3, the geometric pattern defines substantially complete coverage of pixels in an axis of the light propagating through the waveguide to improve the scattering of the light via the pixels. The overlaid intersections of the inside/outside electrodes with the ground electrodes defining the locations of the pixels such that the light propagating along the +x direction encounters a pixel and generally no unoccupied regions to improve light scattering.

Figure 4:
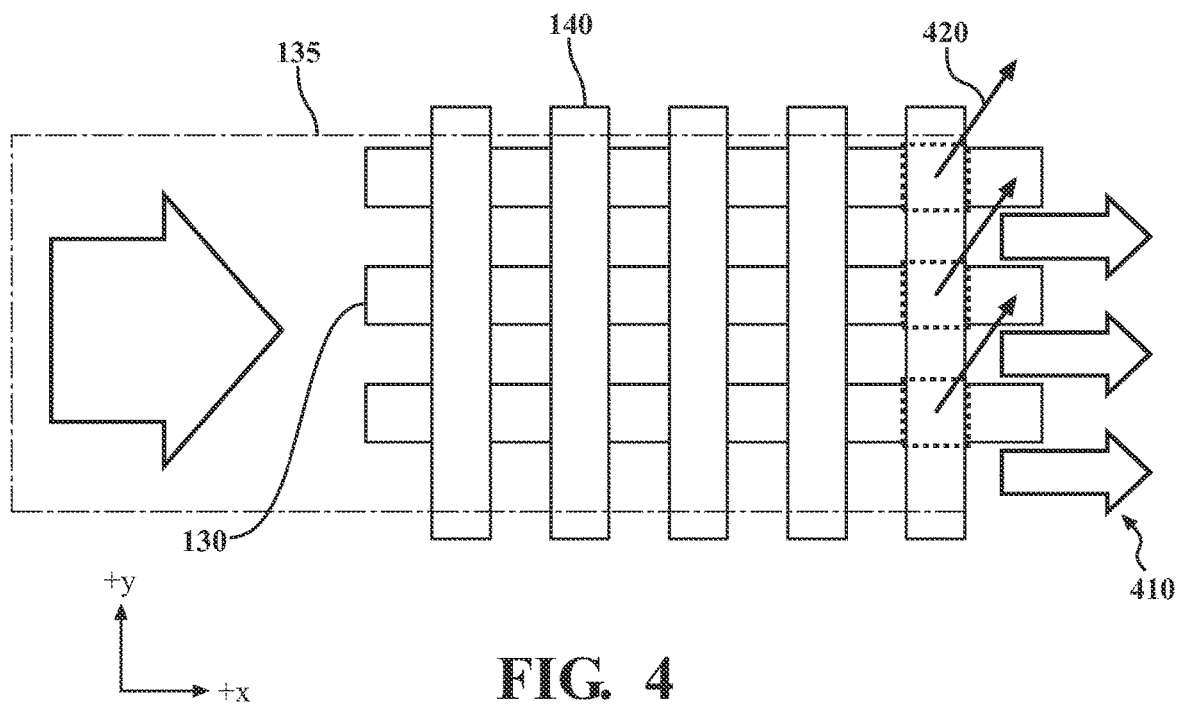
FIG. 4 illustrates an example of an arrangement of electrodes and light scattering in a display.

As a further example of the light scattering within the display, consider FIG. 4. FIG. 4 shows a general view of the electrodes 130/135/140 and light introduced via an edge of a device 400. As shown, the light is injected at the edge and travels in the +x direction. Unoccupied regions are present between the electrodes and permit light 410 to escape the device 400 without being scattered or otherwise used for generating an image. The pixels scatter a percent of the introduced light as scattered light 420. However, the light 410 that escapes diminishes the brightness of the display overall. As such, the geometric patterns described herein improve the light scattering by, for example, reducing the escaped light 410 by limiting the unoccupied regions. It should be appreciated that the dual-side display, as discussed herein, may be used in many different applications, including but not limited to vehicle windows (e.g., driver and passenger side windows), heads-up displays, and so on.

Detailed embodiments are disclosed herein. However, it is to be understood that the disclosed embodiments are intended only as examples. Therefore, specific structural and functional details disclosed herein are not to be interpreted as limiting but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-4, but the embodiments are not limited to the illustrated structure or application.

The flowcharts and block diagrams in the Figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product that comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, module, as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions. The term "operatively connected" and "communicatively coupled," as used throughout this description, can include direct or indirect connections, including connections without direct physical contact.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a standalone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A display, comprising:
   an inside transparent layer disposed parallel to and spaced apart from an outside transparent layer;
   a liquid crystal (LC) layer disposed between the inside transparent layer and the outside transparent layer and together forming a waveguide that is planar;
   ground electrodes disposed between the LC layer and the outside transparent layer and arranged in strips along the outside transparent layer, the strips being spaced apart and parallel;
   inside electrodes and outside electrodes disposed between the inside transparent layer and the LC layer and defining a geometric pattern that is in plane with the waveguide, the geometric pattern including parallel strips of the inside electrodes and the outside electrodes that are together perpendicular to the ground electrodes and forming pixels at overlaid intersections with the ground electrodes to scatter light from the waveguide, wherein the inside electrodes and the outside electrodes are a first width that is substantially the same, and the ground electrodes are a second width that is smaller than the first width; and a light source disposed at an edge surface of the waveguide and providing the light along the waveguide.

2. The display of claim 1, wherein the geometric pattern is a lattice with the inside electrodes and outside electrodes defining a first direction of the lattice and the ground electrodes defining a second direction of the lattice.

3. The display of claim 2, wherein the inside electrodes and the outside electrodes are about 140 μm wide, and the ground electrodes are about 32 μm wide.

4. The display of claim 1, wherein overlaid intersections between the ground electrodes with the inside electrodes and the outside electrodes define pixels that scatter the light by activating the LC layer between the ground electrodes and the inside electrodes and outside electrodes.

5. The display of claim 4, further comprising:
masks positioned between the outside electrodes and the inside transparent layer at overlaid intersections and opposing the inside electrodes between the outside transparent layer and the ground electrodes at the overlaid intersections.

6. The display of claim 5, wherein the pixels include inside pixels associated with the inside electrodes and outside pixels associated with the outside pixels, wherein the masks prevent light from scattering to the outside transparent layer for the inside pixels and to the inside transparent layer for the outside pixels to prevent light bleeding into opposing images.

7. The display of claim 6, wherein the masks are comprised of reflective material on a first side and light-absorbing material on a second side.

8. The display of claim 1, wherein the display is a dual-sided display that displays separate content through the outside transparent layer and the inside transparent layer.

9. The display of claim 1, wherein a viewable region of the display includes transparent area where no pixels are formed, and wherein the transparent area transmits incident light.

10. The display of claim 1, wherein the light source provides the light to scatter through the inside transparent layer and the outside transparent layer according to active pixels in the display.

11. The display of claim 1, wherein the light source is a red, green, blue (RGB) light source comprised of at least one of RGB lasers, light emitting diodes (LEDs), micro-LEDs, and quantum dots.

12. The display of claim 1, further comprising a driver circuit configured to selectively activate the inside electrodes and the outside electrodes to generate images on the display.

13. The display of claim 1, wherein the display is implemented within a vehicle window.

14. A display, comprising:
an inside transparent layer disposed parallel to and spaced apart from an outside transparent layer;
a liquid crystal (LC) layer disposed between the inside transparent layer and the outside transparent layer and together forming a waveguide that is planar;
ground electrodes disposed between the LC layer and the outside transparent layer and arranged in strips along the outside transparent layer, the strips being spaced apart and parallel;
inside electrodes and outside electrodes disposed between the inside transparent layer and the LC layer and defining a geometric pattern that is in plane with the waveguide; and
a light source disposed at an edge surface of the waveguide and providing light along the waveguide,
wherein the geometric pattern includes a diagonal repeating pattern that extends across the ground electrodes with complementary shapes of the inside electrodes and the outside electrodes, and
wherein the geometric pattern defines substantially complete coverage of pixels in an axis of the light propagating through the waveguide to improve scattering of the light via the pixels.

15. The display of claim 14, wherein the inside electrodes, the outside electrodes, and the ground electrodes have widths of about 80 μm.

16. A dual-sided display, comprising:
an inside transparent layer disposed parallel to and spaced apart from an outside transparent layer;
a liquid crystal (LC) layer disposed between the inside transparent layer and the outside transparent layer and together forming a waveguide that is planar;
ground electrodes disposed between the LC layer and the outside transparent layer and arranged in strips along the outside transparent layer, the strips being spaced apart and parallel;
inside electrodes and outside electrodes disposed between the inside transparent layer and the LC layer and defining a geometric pattern that is in plane with the waveguide, wherein the geometric pattern forms pixels at overlaid intersections with the ground electrodes to scatter the light from the waveguide; and
a light source disposed at an edge surface of the waveguide and providing light along the waveguide,
wherein the geometric pattern is one of:
i) a diagonal repeating pattern that extends across the ground electrodes with complementary shapes of the inside electrodes and the outside electrodes, and
ii) parallel strips of the inside electrodes and the outside electrodes that are together perpendicular to the ground electrodes and have a wider width than the ground electrodes.

17. A vehicle window, comprising:
an inside transparent layer disposed parallel to and spaced apart from an outside transparent layer;
a liquid crystal (LC) layer disposed between the inside transparent layer and the outside transparent layer and together forming a waveguide that is planar;
ground electrodes disposed between the LC layer and the outside transparent layer and arranged in strips along the outside transparent layer, the strips being spaced apart and parallel;
inside electrodes and outside electrodes disposed between the inside transparent layer and the LC layer and defining a geometric pattern that is in plane with the waveguide, wherein the geometric pattern defines one of:
i) a diagonal repeating pattern that extends across the ground electrodes with complementary shapes of the inside electrodes and the outside electrodes, and ii) parallel strips of the inside electrodes and the outside electrodes that are together perpendicular to the ground electrodes and have a wider width than the ground electrodes; and a light source disposed at an edge surface of the waveguide and providing light along the waveguide.

\* \* \* \* \*